March 21, 1950 L. M. BERMAN 2,501,154

FREQUENCY METER

Filed July 12, 1947 2 Sheets-Sheet 1

INVENTOR
LEON MARCOVICI BERMAN
BY
Robert E. Burns
ATTORNEY.

March 21, 1950 L. M. BERMAN 2,501,154

FREQUENCY METER

Filed July 12, 1947 2 Sheets-Sheet 2

INVENTOR
LEON MARCOVICI BERMAN
BY
Robert E. Burns
ATTORNEY.

Patented Mar. 21, 1950

2,501,154

UNITED STATES PATENT OFFICE 2,501,154

FREQUENCY METER

Léon Marcovici Berman, Paris, France, assignor to Laboratoires Radioelectriques, Paris, France, a corporation of the French Republic Application July 12, 1947, Serial No. 760,609
In France January 17, 1947

5 Claims. (Cl. 250—39)

Present invention relates to frequency meters for measuring high frequencies as used for long distance signalling in which the frequency to be measured is lowered by means of successive beats in accordance with frequency-standards which are between themselves as the successive powers of 10, so that the resulting frequency for each beat be lower than that of the frequency-standard of the following stage. For this purpose, each stage of beats includes a source of frequency-standard, for instance relaxators or harmonic generators which are all controlled by the same single stabilised oscillator, and a number of fixed circuits tuned in advance permitting the selection of the successive harmonics of the frequency-standard of the stage under consideration as well as a mixing-device and a filter which allow only the passage of the frequencies of the useful beats. The frequency resulting from the beat in the last stage is measured by a low frequency frequencymeter with direct reading and the result of the measurement is supplied by the figure given by the juxtaposition in the natural order of the order numbers of the harmonics selected in the successive stages increased by the figure read on the direct reading frequencymeter.

The carrying out of a frequencymeter of this kind is not free of difficulties. For instance, if harmonics from 1 to 9 are used in each stage as in the instruments of a type which has already been put forward and useful beats are selected by means of a low-pass filter which allows the passage of all frequencies from zero to the fundamental frequency of the frequency-standard, extremely weak frequencies, of the order of a few periods per second and even of a fraction of period, together with the high frequencies which are in the neighbourhood of the higher border of the low-pass filter are to be amplified. Furthermore the troublesome effects due to the parasites coming from the power plant and their harmonics cannot be eliminated. To avoid these inconveniences, it was proposed to use in each stage the harmonics from the fifth harmonic only of the frequency-standard of the stage under consideration, but depending upon the value of the frequency applied in each stage this leads to the use of beats which are now additive and now subtractive, which complicates the measurement and requires a certain skill and a broad experience from the operator.

The frequency meter forming the object of the present invention permits to obviate to all inconveniences mentioned above by simple means and it is characterized by the fact that the filters of the beat-stages are band-pass filters for which the width of the band is equal to that of the frequency-standard of the corresponding stage and for which the lower border is chosen so as to eliminate the disturbing frequencies and their most substantial harmonics.

This transposition of the basic frequencies of the beat-stages entails certain modifications of the instrument, particularly for the frequency mixers, which shall be described further with particulars.

In the way of example, an embodiment of the invention has been described further and shown on the accompanying drawing.

Figure 1:
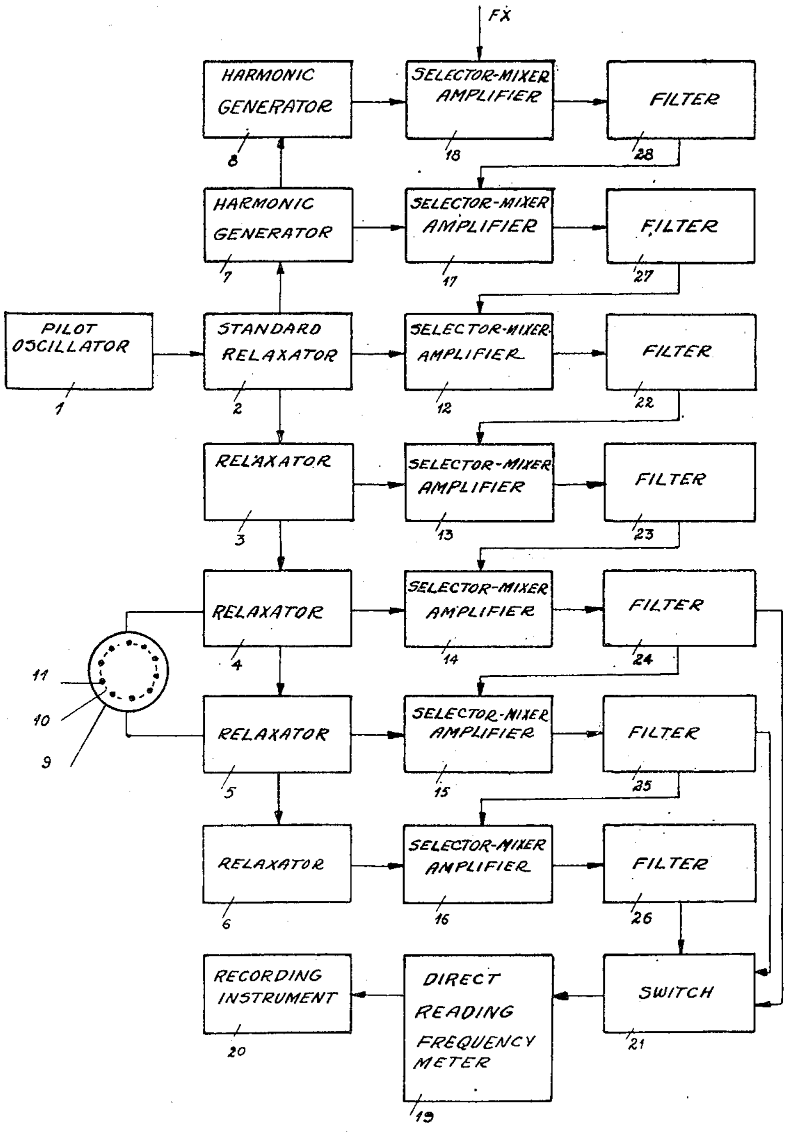
Fig. 1 shows a diagram of the ensemble of the instrument.

As shown diagrammatically on Fig. 1, the frequencymeter forming the object of this invention includes a pilot oscillator 1, stabilised by means of a quartz, and supplying a frequency of 100 kilocycles for instance. This oscillator synchronizes a standard-relaxation oscillator 2 having the same fundamental frequency of 100 kc. and which in turn synchronises a relaxation oscillator 3 of 10 kc. which itself synchronises a relaxation oscillator 4 of 1 kc., and so on, relaxators 5 and 6 having respectively a fundamental frequency of 100 cycles and 10 cycles. On the other hand, relaxation oscillator 2 whose fundamental frequencies is 100 kc. controls a harmonic generator 7 having a fundamental frequency of 1 megacycle and which in its turn controls a harmonic generator 8 having a fundamental frequency of 10 megacycles. In case the instrument should measure frequencies higher than 100 megacycles, it would be possible to add in the same manner stages having higher frequency-standards. The synchronization of each of the relaxation oscillators 2 to 6 is controlled by means of a small cathode oscillograph 9 in the manner shown on Fig. 1 for the relaxation oscillator 5 of 100 cycles: for this purpose the two pairs of deflecting plates are fed simultaneously by the synchronized relaxation oscillator 5 so that the spot describes on the screen of the oscillograph a circle 10 shown in doted lines; on the other hand the cathode beam is controlled by the synchronizing relaxation oscillator 4 so that there appears on circle 10 a number of bright points 11, this number being equal to the ratio of the two frequencies which must be therefore equal to 10 at synchronism, which can be easily ascertained in this manner.

The generators of frequency-standards 2 to 8 in each stage supply respectively ensembles of selectors—mixing devices—amplifiers 12, 13, 14, 15, 16, 17, 18, the frequency to be measured being applied on the mixer of group 18 of the uppermost stage. These ensembles are respectively connected to filters 22 to 28, each of which is supplying the mixing device of the following stage, with the exception of the last filter 26 which supplies a direct reading frequencymeter 19 eventually connected to a recording instrument 20. The direct reading frequency meter may also be connected to the output of filters 25 and 24 by means of a suitable switching device 21. As indicated above, filters 22 to 28 are band-pass filters for which the width of the band is equal to the fundamental of the standard generator of the corresponding stage, say 10 megacycles at 10 cycles, and for which the lower borders are chosen so as to eliminate troublesome beats and low frequency parasites such as those due to the power plant. In the selected example, the passing bands of filters for the first five stages, from that of 10 mc. until that of 1 kc., are thus transposed by 600 cycles in order to allow respectively the passage of frequencies from 600 to 10,000,600, from 600 to 1,000,600, from 600 to 100,600, from 600 to 10,600 and from 600 to 1,600, while the passing band of filter 25 of the 100 c. stage is chosen so as to allow the passage of frequencies from 120 to 220 cycles while filter 26 of the 10 c. last stage allows the passage of frequencies from 10 to 20 cycles.

The selectors of the first five beat-stages include each nine circuits tuned in advance which permit to select the first nine harmonics of the corresponding generator and their tuning knobs provide for ten positions numbered from 0 to 9 and which correspond respectively to the blocking of the frequency-standard and to the passage of one of the first nine harmonics. In order to permit the measurement, due account being automatically taken of the 600 cycles shift caused by the filters of the first five stages and the 10 cycles shift caused by the filter of the last stage, the figures on the scale of the direct reading frequency meter are increased by 610, that is to say for instance that a frequency of 12 cycles will bring the pointer on the division marked 622. On the other hand, selector 15 of the 100 cycle stage includes for the same purpose ten positions for 0 to 9 corresponding to the blocking of the frequency of the standard generator 5 and to the passage of the 5th to the 14th harmonics of the 100 cycle frequency, i. e. the frequencies with 500, 600, 700, 800, 900, 1000, 1100, 1200, 1300 and 1400 cycles. Finally selector 16 of the last stage is provided with ten positions corresponding to the blocking of the frequency of standard-generator 6 and to the passage of the 11th to the 20th harmonics of the frequency of the latter generator, i. e. the frequencies with 110, 120, 130, 140, 150, 160, 170, 180, 190 and 200 cycles.

The operation of this instrument will be better understood with the aid of a numerical instance:

Assuming that the frequency to be measured is 45,854,932 cycles per sec.:

The first beat takes place on position 4 of selector 18 of the 10 mc./sec.:

45,854,932−40,000,000=5,854,932 c./sec.

That frequency passing through filter 28,600 c./sec. to 10,000,600 c./sec.

The following beat takes place on position 5 of selector 17 of the 1 mc./sec.:

5,854,932−5,000,000=854,932 c./sec.

and that frequency passes through filter 27 of 600 c./sec. to 1,00,600 c./sec.

Selector 12 of the 100 kc./sec. on position 8, produces the beat:

854,932−800,000=54,932 c./sec.

which passes through filter 22 of 600 c./sec. to 100,000 c./sec.

Selector 13 of the 10 kc./sec., on position 5, produces the beat:

54,932−50,000=4,932 c./s.

passing through the filter 23 of 600 c./sec. to 10,600 c./sec.

Selector 14 of the 1 kc./sec., on position 4, produces the beat:

4,932−4,000=932 c./s.

passing through the filter 24 of 600 c./sec. to 10,600 c./sec.

Selector 15 of the 100 c./sec., on position 3, produces the beat:

932−800=132 c./s.

passing through the filter 25 of 120–220 c./sec.

Finally, selector 16 of the 10 c./sec., on position 1, produces a beat:

132−120=12 c./s.

passing the filter 26 of 10–20 c./s.

The direct reading frequency meter receives that frequency of 12 c./sec. but reads 622 c./sec.

The unknown frequency is therefore:

$$\begin{array}{r} 45,854,31 \\ +\quad 622 \\ \hline 45,854,932 \end{array}$$

Figure 2:
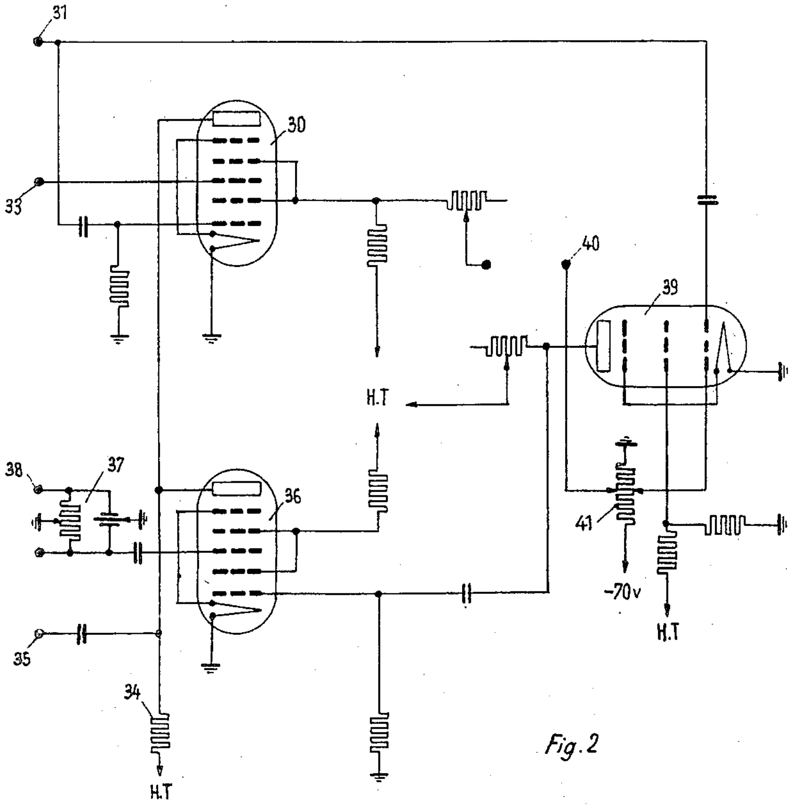
Fig. 2 shows the diagram of the mixers used in the successive beat-stages.
Figure 3:
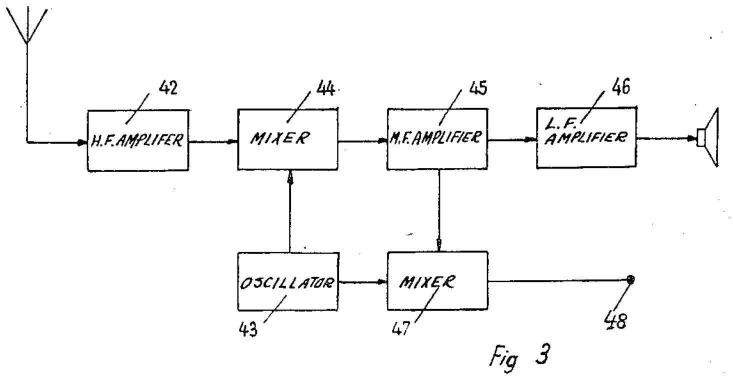
Fig. 3 shows the diagram of a receiver designed to receive and to amplify a frequency to be measured and originating from a remote generator.

As a matter of fact the operation of the instrument is the same as described above on the condition that the mixing device on each stage supplies only the sum and the difference of the two beating frequencies, the difference between these two frequencies being used for the following stage and passing through the filter which always blocks the sum of those two frequencies. On the contrary it is advisable to eliminate the beating frequencies themselves on the output of the mixing tube, for they can, under certain conditions, pass through the filter as well as the low frequency parasites which accompany the frequency to be measured or the oscillation of the beat issued from the preceding stage. Furthermore, the beat itself, when it takes place in a mixing tube in which the two interfering oscillations are applied on two grids, may give rise to troublesome beat oscillations which shall be eliminated by a careful selection for each stage of the operation point on the grid-plate characteristic curves of the mixing tubes which shall be preferably heptodes. The elimination of parasitic oscillations mentioned above, and particularly that of the beating frequencies themselves, is obtained in a very satisfactory manner by means of a mixing device as shown on Fig. 2. This mixing device consists of a first mixing tube 30, preferably a heptode, of which the first control grid receives by means of terminal 31 the frequency to be measured or the beat frequency coming from the preceding stage and the second control grid 32 receives by means of terminal 33 the standard frequency of the corresponding stage. The beat oscillation, as well as the two beating oscillations, accompanied with their parasites, are found again in the load resistance 34 connected to the output terminal 35. A second identical tube 36 whose plate is connected to resistance 34 may receive on its second control grid the frequency-standard through an intermediate phase shifting device 37 adjusted so that when terminals 33 and 38 are connected together, those two tubes are supplied in phase opposition by the standard frequency in such a way that this frequency finds itself compensated in the common load resistance 34 and is not sent in the band-pass filter of the stage. The first control grid of tube 36 is connected to the plate of a third tube 39, for instance a pentode, whose control grid is connected to the input terminal 31, so that, when that tube 39 is operating, the first control grid of the second tube 36 is supplied in phase opposition with the corresponding grid of the first tube 30 in such a manner that the frequency to be measured and the parasites which go with it are found to be compensated in the load resistance 34 and are not transmitted to the stage filter. The setting up of tube 39 into operation or its blocking are effected by earthing or insulating terminal 40 connected to the biassing resistance 41 of the control grid of tube 39.

Three typical cases may arise in the operation of this mixing device. It will be assumed to fix up ideas that one is dealing with the stage of the frequency-standard 100,000 cycles.

1. If the frequency applied to the input terminal 31 is lower than 100,600 cycles, no beat whatsoever capable of passing through the stage filter can be obtained for any corresponding position of the selector which in this case is set on position 0, so that the frequency applied on 31 passes simply through tube 30 which operates as an amplifier. In this case terminals 33 and 38 are not connected and terminal 40 is isolated so that tubes 36 and 39 are not in operation. The frequency applied on terminal 31 passes directly to the following stage.

2. If the frequency applied on terminal 31 is included between 10,600 and 200,600, the stage selector is on position 1. In this case the standard frequency 100,000 is troublesome for it can pass through the stage filter whose band goes from 600 to 100,600. That frequency is eliminated by means of tube 36 by connecting terminals 33 and 38 so that those two tubes supply in the load resistance 34 equal and opposite voltages at 100,000 cycles. As to the frequency applied in 31, it cannot pass through the filter so that tube 39 is not set in operation.

3. When the frequency applied in 31 is included between 200,600 and 900,600, the frequency-standard is not anymore dangerous for it is lying outside of the passing band of the filter. On the contrary the harmonics of the power plant and the parasitic low frequency beats which accompany the frequency applied in 31 must be eliminated, this being obtained by earthing terminal 40 of tube 39 on the plate of which all these frequencies are found again after inverting phases; they are applied on the first grid of tube 36 so that they make up in the common load resistance 34, for the frequencies of the same value coming from the mixing tube 30.

The working up of tubes 36 and 39 is preferably operated automatically by the controlling knob of the selector through a suitable change-over switch.

When the frequency to be measured is that of an oscillation coming from a remote signal emitter, the frequency meter in accordance with the invention shall preferably be supplied by means of a special receiver made up of a receiver of current type including a H. F. amplifier 42, a local oscillator 43, a mixing device 44, a medium frequency 45 and a L. F. stage 46 to which a second mixing device 47 has been added which receives the local oscillation produced in 43 together with the medium frequency amplified oscillation coming from 45, in order to reconstitute the H. F. oscillation to be measured which is taken up on terminal 48 to which the frequency meter is connected.

What I claim is:

1. A high frequency meter comprising several beat-stages in succession for successively lowering the frequency to be measured, each stage comprising means for producing a frequency-standard, said frequency-standards being between themselves as the successive powers of 10; a selector provided with a number of pretuned circuits for selecting the successive harmonics of the frequency-standard; one single stabilized oscillator for controlling said means for producing said frequency-standards; a mixing device including a first mixing tube receiving the two oscillations producing the beat; a second identical tube receiving the standard frequency only and which is in phase opposition with respect to the first tube; a third tube receiving only the frequency resulting from the preceding beat, the anode of the third tube being connected to the input circuit of the second tube; a stage filter; means for automatically putting in circuit the second tube by the selector of the corresponding stage on its positions for which the frequency-standard is included in the passing band of the filter of said stage; means for automatically putting in circuit the third tube for the selector positions for which the frequencies of the parasitic beats may be included in the passing band of the stage filter, the selector of the stages having a standard frequency of 1 kilocycle and above comprising circuits tuned with the first nine harmonics of the standard frequency and the selector in the stage whose frequency-standard is 100 cycles including circuits which are respectively tuned with the 5th and 14th harmonics of that frequency, while the selector in the stage whose frequency-standard is 10 cycles includes circuits which are respectively tuned with the 11th and 20th harmonics of the latter frequency; said above stage filter allowing the passage of the frequencies of the useful beats and being a pass-band filter for which the width of the band is equal to the standard frequency of the corresponding stage and the lower border of the band for the stages having frequency-standards from 1 kilocycle to 10 megacycles being equal to 600 cycles so as to eliminate lower and parasitic frequencies and their most substantial harmonics, while for the stage whose frequency-standard is 100 cycles the lower border of the band is equal to 120 cycles and for the last stage whose frequency-standard is 10 cycles the lower border of the band is equal to 10 cycles; a low frequency direct reading instrument measuring the frequency resulting from the beat in the last stage and which is provided with divisions on its dial on which figures are increased by 610.

2. A high frequency meter according to claim 1 wherein the first two tubes of the mixing device are heptode tubes while the third tube is a pentode.

3. A high frequency meter comprising several beat stages for successively lowering the frequency to be measured, each stage comprising means for producing a frequency standard and a selector for selecting the successive harmonics of the frequency standard, a mixing device comprising two mixing tubes provided with a common load resistance and with means for applying in phase opposition to the input circuits of said tubes respectively the frequency standard and the frequency to be measured in the considered stage.

4. A high frequency meter comprising several beat stages in succession for successively lowering the frequency to be measured, each stage comprising means for producing a frequency-standard, said frequency-standards being between themselves as the successive powers of 10; a selector provided with a number of preturned circuits for selecting the successive harmonics of the frequency-standard; one single stabilized oscillator for controlling said means for producing said frequency-standards; a mixing device including a first mixing tube receiving the two oscillations producing the beat; a second identical tube receiving the standard frequency and which is in phase opposition with respect to the first tube; a third tube receiving only the frequency resulting from the preceding beat, the anode of the third tube being connected to the input circuit of the second tube; means for operating the second and the third tube independently from one another and from the first tube.

5. A high frequency meter comprising several beat stages in succession for successively lowering the frequency to be measured, each stage comprising means for producing a frequency-standard, said frequency-standard being between themselves as the successive powers of 10; a selector provided with a number of pretuned circuits for selecting the successive harmonics of the frequency-standard; one single stabilized oscillator for controlling said means for producing said frequency-standards; a mixing device including a first mixing tube receiving the two oscillations producing the beat; a second identical tube receiving the standard frequency and which is in phase opposition with respect to the first tube a third tube receiving only the frequency resulting from the preceding beat, the anode of the third tube being connected to the input circuit of the second tube; a stage filter; means for automatically putting in circuit the second tube by the selector of the corresponding stage on its positions for which the frequency-standard is included in the passing band of the filter of said stage; means for automatically putting in circuit the third tube for the selector positions for which the frequencies of the parasitic beats may be included in the passing band of the stage filter.

LÉON MARCOVICI BERMAN

REFERENCES CITED

The following references are of record in the file of this patent:

UNITED STATES PATENTS

| Number | Name | Date |
|---|---|---|
| 1,934,879 | Potter | Nov. 14, 1933 |
| 2,131,558 | Granger | Sept. 27, 1938 |
| 2,131,559 | Granger | Sept. 27, 1938 |

OTHER REFERENCES

A Device for the Precise Measurement of High-Frequencies, Polkinghorn and Roethen, Bell Telephone System Technical Publication Mimeograph B-578, July 1931.